(12) United States Patent
Bina et al.

(10) Patent No.: US 12,149,671 B2
(45) Date of Patent: Nov. 19, 2024

(54) TELEPRESENCE SYSTEM AND METHOD

(71) Applicant: INTERAPTIX INC., Toronto (CA)

(72) Inventors: Bardia Bina, Toronto (CA); Dae Hyun Lee, Etobicoke (CA); Nicholas Paul Leerentveld, Waterdown (CA)

(73) Assignee: INTERAPTIX INC., Toronto (CA)

( * ) Notice: Subject to any disclaimer, the term of this patent is extended or adjusted under 35 U.S.C. 154(b) by 0 days.

(21) Appl. No.: 17/737,841

(22) Filed: May 5, 2022

(65) Prior Publication Data

US 2022/0264068 A1 Aug. 18, 2022

Related U.S. Application Data

(63) Continuation of application No. 16/472,409, filed as application No. PCT/IB2017/058304 on Dec. 21, 2017, now abandoned.

(60) Provisional application No. 62/437,650, filed on Dec. 21, 2016.

(51) Int. Cl.
*H04N 13/117* (2018.01)
*H04N 7/15* (2006.01)

(52) U.S. Cl.
CPC ............ *H04N 13/117* (2018.05); *H04N 7/15* (2013.01)

(58) Field of Classification Search
CPC .................................. H04N 13/117; H04N 7/15
See application file for complete search history.

(56) References Cited

U.S. PATENT DOCUMENTS

| 5,384,912 A | * | 1/1995 | Ogrinc | H04N 7/002 |
| | | | | 348/E7.091 |
| 6,583,808 B2 | | 6/2003 | Boulanger et al. | |
| 7,532,230 B2 | | 5/2009 | Culbertson et al. | |
| 7,616,226 B2 | | 11/2009 | Roessler et al. | |
| 10,607,395 B2 | * | 3/2020 | McCarthy | G06T 15/20 |
| 10,757,529 B2 | * | 8/2020 | Laitinen | H04S 7/304 |
| 2003/0067536 A1 | * | 4/2003 | Boulanger | H04N 13/376 |
| | | | | 348/E13.058 |
| 2003/0197779 A1 | * | 10/2003 | Zhang | H04N 7/144 |
| | | | | 348/14.09 |
| 2005/0168403 A1 | * | 8/2005 | Ebersole | G02B 27/017 |
| | | | | 345/8 |
| 2008/0246834 A1 | | 10/2008 | Lunde et al. | |
| 2010/0321500 A1 | | 12/2010 | Cornett et al. | |
| 2011/0283203 A1 | | 11/2011 | Periyannan et al. | |
| 2012/0274736 A1 | * | 11/2012 | Robinson | H04L 65/1083 |
| | | | | 348/E7.083 |

(Continued)

OTHER PUBLICATIONS

ISA/CA, International Search Report and Written Opinion, Apr. 23, 2018, re PCT International Patent Application No. PCT/IB2017/058304.

(Continued)

*Primary Examiner* — Phung-Hoang J Nguyen
(74) *Attorney, Agent, or Firm* — Perry + Currier Inc.

(57) ABSTRACT

A telepresence method includes capturing video at a source location, the videos including a subject within their respective points of view. The method further includes determining a viewpoint of a remote user at a remote location other than the source location, creating a synthetic video from the captured video, with the synthetic video corresponding to the determined viewpoint of the remote user, and displaying the synthetic video of the subject to the remote user.

11 Claims, 6 Drawing Sheets

(56) References Cited

U.S. PATENT DOCUMENTS

| | | | | |
|---|---|---|---|---|
| 2014/0225978 A1* | 8/2014 | Saban | ............ | G06T 7/0012 |
| | | | | 348/14.07 |
| 2015/0163454 A1* | 6/2015 | Smith | ............ | H04N 13/243 |
| | | | | 348/14.07 |
| 2015/0341614 A1* | 11/2015 | Senoh | ............ | H04N 13/161 |
| | | | | 348/43 |
| 2016/0219248 A1 | 7/2016 | Reznik et al. | | |
| 2016/0300463 A1* | 10/2016 | Mahar | ............ | H04N 7/181 |
| 2017/0316806 A1* | 11/2017 | Warren | ............ | G11B 27/031 |
| 2017/0353731 A1* | 12/2017 | Wade | ............ | H04N 7/181 |

OTHER PUBLICATIONS

WIPO/IB, International Preliminary Report on Patentability (Ch. 1), Jul. 4, 2019, re PCT International Patent Application No. PCT/IB2017/058304.

* cited by examiner

TELEPRESENCE SYSTEM AND METHOD

FIELD OF THE INVENTION

The present invention relates to a telepresence system and method.

BACKGROUND OF THE INVENTION

Virtual reality (VR) and augmented reality (AR) systems have existed, in different configurations and with different capabilities, for many years. Recent developments in display technologies, graphics processing capabilities and computing systems have rekindled the interest and development of such systems.

For some years, one of the proposed uses for virtual reality has been for telepresence, which can be defined as a system which provides a user with the perception that they are at a location other than their actual location.

One known approach for creating telepresence is the VR CAVE, as pioneered at the Electronic Visualization Laboratory at the University of Illinois at Chicago. VR CAVEs typically include a defined area within walls upon which rendered scenes, produced by a VR system, can be projected to a user located within the area. In some installations, the user could wear electronically controlled stereo glasses which worked with the projectors to provide the user with stereo views of the rendered scenes, providing the user with some level of perception that they were at a different location, within the rendered scenes.

Further development of VR technologies has resulted in the development of wearable VR Headsets which have negated the need for rear projectors and/or enclosed defined spaces for telepresence systems. Specifically, VR headsets such as the Oculus Rift™, HTC Vive™, SulonQ™ and Fove VR™ and augmented reality headsets such as the Microsoft Hololens™ and/or ODG R-7 headset are worn by a user and provide per-eye displays, or projectors into the user's eyes, upon each of which a slightly different rendered scene, to achieve stereoscopic (3D) views, can be displayed to the user. The headsets can also include an on-board position and orientation sensor, or work with an external sensor system or a combination of both, to determine the orientation of the user's head and their viewpoint. The VR system renders a desired scene to correspond to the determined user viewpoint and updates the rendering to correspond to new viewpoints as the user's viewpoint changes as they move their head or position.

More recently, "teleportation" systems have been developed wherein two or more users in a virtual reality environment are displayed in each other's VR headset as computer rendered "avatars". These avatars act as "placeholders" to indicate the presence of a first user to a second user and also, when a portion of the first user's body would be visible in the first user's VR headset, the corresponding portions of the avatar are rendered and displayed in the first user's VR headset.

While such systems now create results which can be successful in providing a user with some level of perception that they and others are actually within a rendered scene, these existing systems still suffer from some disadvantages.

SUMMARY OF THE INVENTION

According to one aspect of the present invention, a telepresence method includes capturing video at a source location, the videos including a subject within their respective points of view. The method further includes determining a viewpoint of a remote user at a remote location other than the source location, creating a synthetic video from the captured video, with the synthetic video corresponding to the determined viewpoint of the remote user, and displaying the synthetic video of the subject to the remote user.

According to another aspect of the present invention, a telepresence method is operable to provide a shared telepresence meeting for at least a first remote user and a second remote user. The method includes capturing video with at least one point of view at a first remote location of the first remote user, the video including the first remote user within their point of view. The method further includes capturing video with at least one point of view at a second remote location of the second remote user, the video including the second remote user within their point of view. The method further includes determining a viewpoint of the first remote user at a first remote location, determining a viewpoint of the second remote user at a second remote location, creating a synthetic video from the captured video at the first remote location, with the synthetic video corresponding to the determined viewpoint of the second remote user, and creating a synthetic video from the captured video at the second remote location, with the synthetic video corresponding to the determined viewpoint of the first remote user. The method further includes displaying the synthetic video of the second remote user to the first remote user and displaying the synthetic video of the first remote user to the second remote user such that the first remote user and the second remote user share a telepresence meeting.

The present invention provides a novel telepresence system and method which provides a remote user with synthetic video of a subject, located at a source location. The synthetic video is a view formed from video captured from one or more points of view at the source location. The synthetic video is formed to correspond to the viewpoint the remote user would have of the subject if the remote user was physically present at the source location. Multiple different synthetic videos may be generated from different points of view to achieve a stereoscopic effect.

A synthetic video may be composited with a rendered component such that the remote user sees the subject within a rendered scene. Elements from a captured scene may be used in addition to or as an alternative to a rendered scene. For example, a synthetic video may be superimposed on a captured scene of the user's environment or superimposed on the user's view of the real environment through a transparent display.

The remote user may have a display device, such as a VR headset, which includes one or more cameras capturing the surroundings and/or body image of the remote user and the telepresence system and method employs chromakey or depth sense technologies to composite the remote user and/or the subject into the rendered scene. A display device may be an AR headset, which may have one or more look-through cameras to capture the scene around the user or may have one or more optically transparent or see-through screens. Other display devices are also contemplated, such as smartphones, tablet computers, fixed displays, and the like.

These and other aspects of the present invention will be discussed in further detail below.

BRIEF DESCRIPTION OF THE DRAWINGS

Embodiments of the present invention will now be described, by way of example only, with reference to the attached Figures, wherein.

DETAILED DESCRIPTION OF THE INVENTION

The present invention relates to a system and method for providing a user with an experience intended to promote a sense on the part of a user that the user is sharing an environment with at least one other user who is not actually present at the location of the user.

The present invention applies to virtual reality, augmented reality, and similar systems. Examples pertaining to virtual reality may apply to augmented reality, and vice versa. For instance, in virtual reality systems a background may be computer generated, whereas in augmented reality systems some or all of the background is real. In virtual reality systems, a user may be "teleported" to a location by changing the background. Such a location may contain other users. In augmented reality, remote users can be rendered in a local user's view, so that the local user may view the remote users in the local user's environment. Further, virtual reality systems tend to use stereoscopic displays, whereas augmented reality systems may use stereoscopic displays, monoscopic displays, such as one a screen of a phone or tablet computer. It should be understood that the techniques discussed herein, when described in terms of virtual reality, may be used in augmented reality systems with the appropriate modification without departing from the scope of this disclosure. Likewise, techniques described in terms of augmented reality may be used in virtual reality systems with the appropriate modification without departing from the scope of this disclosure.

As described herein, the present invention can be implemented in a variety of manners and with various levels of complexity but the features and the capabilities of the invention will be apparent after considering the embodiments described herein.

Figure 1:
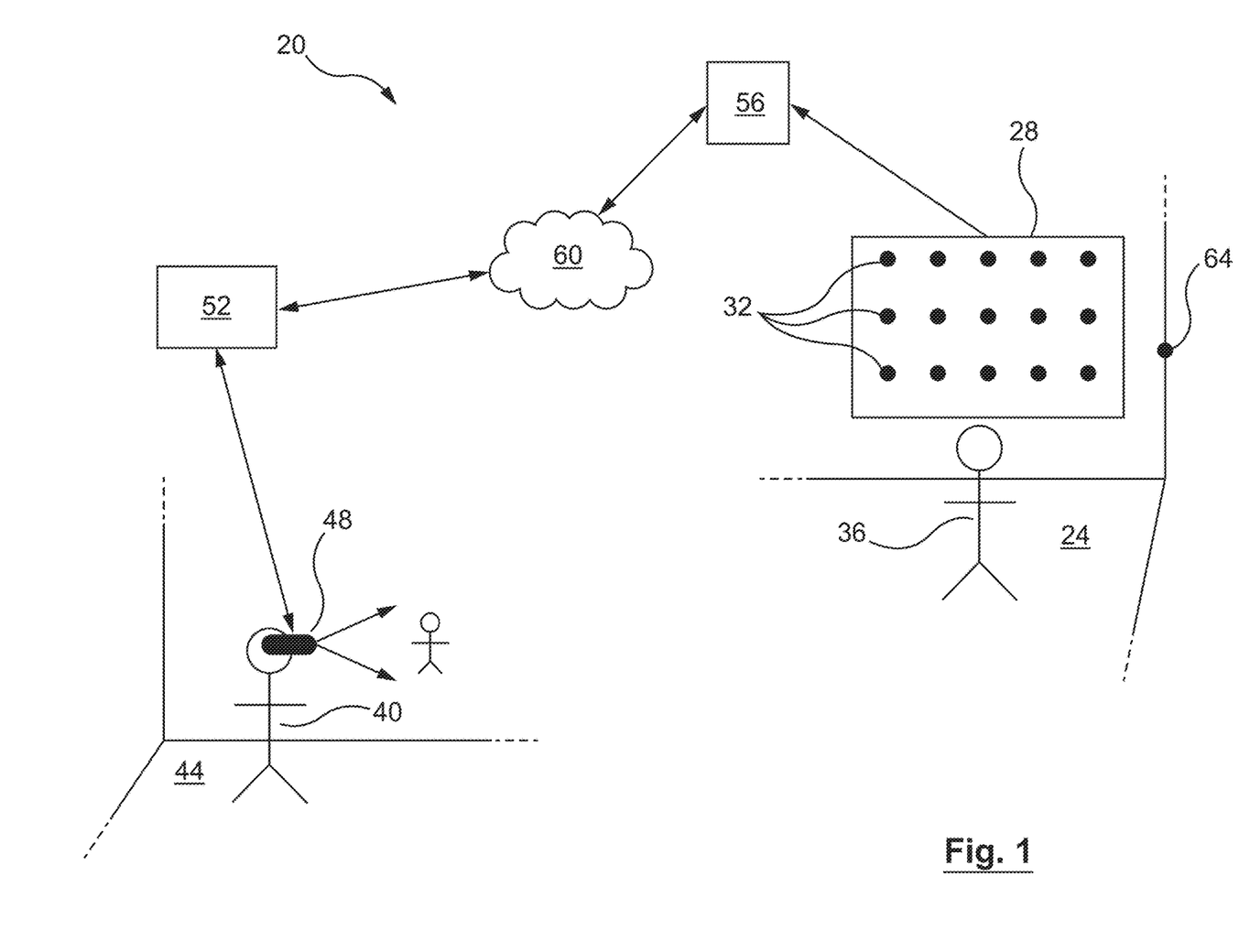
FIG. 1 shows a representation of a one-way telepresence system.

FIG. 1 shows a "one-way" telepresence system 20 in accordance with an embodiment of the present invention. In this embodiment, a source location 24 includes an array 28 of video cameras 32 which capture video of a target area which is of interest at source location 24. Any number of video cameras 32 may be used. In other embodiments, one video camera 32 is used.

In this embodiment, the array 28 of cameras 32 provides at least two different points of and array 28 can comprise two or more individual cameras 32, spaced from one another, or can be one or more lightfield (plenoptic) cameras or a combination of both. As a lightfield camera captures multiple points of view of a target area, similar to individual, spaced cameras, both of these configurations (multiple individual cameras or one or more lightfield cameras) are referred to herein, for clarity, as cameras 32. A source location subject 36, such as a person, is located within the target area and cameras 32 capture video of subject 36 with at least two different, predefined, points of view.

In other embodiments, such as embodiments with one video camera 32, one point of view of the target area of interest is captured. A 3D model of a captured subject may be generated based on one or more captured points of view. More captured points of view may make the model easier to generate or more accurate. However, it is contemplated that a serviceable model may be generated from one point of view, such model being generated with computational efficiency and accuracy that improves as related technologies improve.

A user 40 of system 20 is located at a remote location 44 and is equipped with a display device 48 or equivalent. A display device 48 may provide stereoscopic or monoscopic display. The display device 48 may be a VR or AR headset, a smartphone adapted to be worn in front of the eyes as a headset, a smartphone or tablet computer held in the hand, or similar. An example AR headset, which may be stereoscopic or monoscopic, includes one or more cameras pointing in the direction that the user is looking, so that the scene around the user can be captured and displayed to the user. Another example AR headset includes one or more optically transparent or see-through display devices. The display device 48 is considered to be a VR headset for ease of explanation of various embodiments below.

As used herein, the term VR headset is intended to comprise headsets intended for VR uses, as well as headsets intended for Mixed Reality and/or Augmented Reality uses, as well as other hardware configurations such as VR helmets, glasses, etc. VR headset 48 includes a head position and orientation tracking system, or uses or cooperates with an external head position and orientation tracking system (not shown), to determine the relative location and viewpoint of user 40 within remote location 44.

As mentioned above, many commonly available commercial VR headsets include location and head tracking systems and the operation and performance of such systems are well understood by those of skill in the art. Similarly, external tracking systems to determine the location and head position (and hence viewpoint) of a user are also well known, examples including the Optitrack systems sold by NaturalPoint, Inc., Corvallis, OR, USA, and their operation and performance are also well understood by those of skill in the art.

When the display device 48 is not a headset and is intended to be held in the hand, for example, location and tracking may be performed for the device 48 itself rather than a user's head. The display device 48 may include an accelerometer or similar transducer for this purpose.

Remote location 44 further includes a telepresence server 52 which is connected to headset 48, either by a tethered wired or wireless connection. Telepresence server 52 can be any of a wide variety of computing devices, including an appropriately programmed general purpose computing device, a purpose built computing device or a general purpose computing device equipped with special purpose hardware, such as a server equipped with a set of GPU (graphic processor units) coprocessors or FPGA coprocessors to provide additional computational resources, if necessary, to perform the computing operations described herein below. Telepresence server 52 can also be a combination of two or more computing devices, each of which processes a subset of the data or performs a subset of the functions herein attributed to telepresence server 52.

Telepresence server 52 is operable, amongst other functions, to receive data representing the head location and orientation of user 40 from headset 48 and/or an external head position and orientation tracking system to determine the user's head position and orientation and, as described further below, provides the video signals to VR headset 48 of user 40. Further, telepresence server 52 maintains a source location position for the head of user 40. Specifically, when user 40 first enters system 20, telepresence server 52 determines the head position of user 40 in remote location 44 and sets a source location position, within source location 24, to correspond to the determined head position location of user 40 (e.g.—three feet in front of subject 36) and telepresence server 52 uses this source location position in constructing the video displayed to user 40 in VR headset 48, as described below.

As user 40 moves within remote location 44, the source location position is updated to track any changes of the head position of user 40, as determined by VR headset 48 and/or any external head position and orientation tracking system. Thus, in the example mentioned above, if user 40 is initially determined to be three feet in front of subject 36 and then moves their head back one foot to a distance of four foot from the front of subject 36, telepresence server 52 updates the source location position, and the corresponding rendered videos displayed in VR headset 48, to a value corresponding to four feet in front of subject 36.

Source location 24 includes a video processing server 56 which can be any of a wide variety of computing devices, including an appropriately programmed general purpose computing device, a purpose built computing device or a general purpose computing device equipped with special purpose hardware, such as a server equipped with a set of GPU (graphic processor units) coprocessors or FPGA coprocessors to provide additional computational resources, if necessary, to perform the computing operations described herein below. Video processing server 56 can also be a combination of two or more computing devices, each of which processes a subset of the data or performs a subset of the functions herein attributed to video processing server 56.

Video processing server 56 receives the video output of each camera 32 in array 28 and video processing server 56 can process the captured video in a number of ways, including applying calibration transformations for each video camera, if necessary, matching brightness and contrast, etc. but these operations are typically not required to be performed in real time and, more likely, will be performed once as source location 24 is initially set up.

Video processing server 56 compresses the captured video from cameras 32 for transmission through a data communication network 60 using a suitable codec such as H.264, H.265, VP9 or other suitable compression technique as will occur to those of skill in the art. Data communications network 60 can be the Internet or any other suitable public or private data network, to telepresence server 52 at remote location 44.

Telepresence server 52 at remote location 44 receives the processed captured video data, via data network 60, from video processing server 56. Telepresence server 52 then uses the received processed captured video to construct a view of subject 36 which corresponds to the determined viewpoint of user 40 obtained from the source location and the head position and orientation from headset 48 and/or an external head location and orientation tracking system.

The method by which telepresence server 52 constructs the view of subject 36 to display within headset 48 is not particularly limited. In this embodiment, synthetic left and right eye views are formed for user 40 by applying real time view interpolation techniques to some or all of the captured video signals received from cameras 32 via data network 60, or by employing a light field rendering technique to some or all of the captured video signals received from cameras 32 or by performing a combination of these two techniques or any other suitable technique for creating a synthetic video from the captured video signals from cameras 32.

In other embodiments, the view of subject 36 includes a synthetic video that is rendered from a 3D model of the subject. The 3D model may be generated by the telepresence server 52. One or more cameras 32 may be used to generate the 3D model. The 3D model may be generated and textured using only captured video and without the use of depth sensors.

An example of another technique which can be employed to form the synthetic videos comprises using depth information, which can be obtained via the outputs of the cameras 32 or via a depth sensor, to generate a 3D surface mesh of subject 36 and telepresence server can apply an associated "texture" (obtained from cameras 32) to the mesh to render a 3D model. Other suitable techniques will be apparent to those of skill in the art.

Thus, telepresence server 52 may create synthetic videos of subject 36 for the left and right eyes of user 40 which correspond closely to what the eyes of user 40 would see if user 40 was physically present at the source location position at source location 24, with their head orientated as determined from headset 48 and/or an external head location and orientation tracking system.

These synthetic videos are then displayed, by headset 48, to user 40 who, as a result, will largely perceive themselves as being present at source location 24 with subject 36 in their field of view. In embodiments that use AR, the user 40 may perceive the subject 36 to be present at the user's location 44.

In various other embodiments, one or more synthetic videos of subject 36, whether directly captured, synthetically generated based on the captured video, or rendered using a 3D model, may be displayed on other kinds of display devices 48. For example, a flat screen may be used as a monoscopic display device 48 to display one synthetic video. Various other examples are contemplated and discussed elsewhere herein.

It is also contemplated that, to further enhance the experience of user 40, audio signals can be captured at source location 24 and provided to user 40 at remote location 44. For example, source location 24 can be equipped with a set of microphones to capture audio from source location 24. Preferably, source location 24 will include a set of microphones (not shown) which can capture audio from source location 24 with sufficient information (stereophonic and depth-aware) to allow telepresence server 52 to construct an audio signal for user 40 which corresponds to what they would hear if physically present at their source location position, and with their determined head orientation, at source location 24.

For example, if source location 24 is a rectilinear enclosed space, source location 24 can be equipped with microphones 64, one at each corner of the enclosed space. The resulting four captured audio streams can be provided to telepresence server 52, via data network 60, and telepresence server 52 can appropriately delay and mix the captured audio streams to create synthetic left and right audio streams which correspond to what user 40 would hear if they were present at the source location position, with their head in the determined orientation.

As should be understood, the provision of audio to user 40 is an optional, but preferred, feature to further enhance the experience of user 40. While the audio feature described above is presently preferred it is also contemplated that a simpler audio feature, whereby audio is captured at source location 24 and is merely forwarded to user 40, without the construction of synthetic streams, may also be sufficient in some circumstances.

Figure 2:
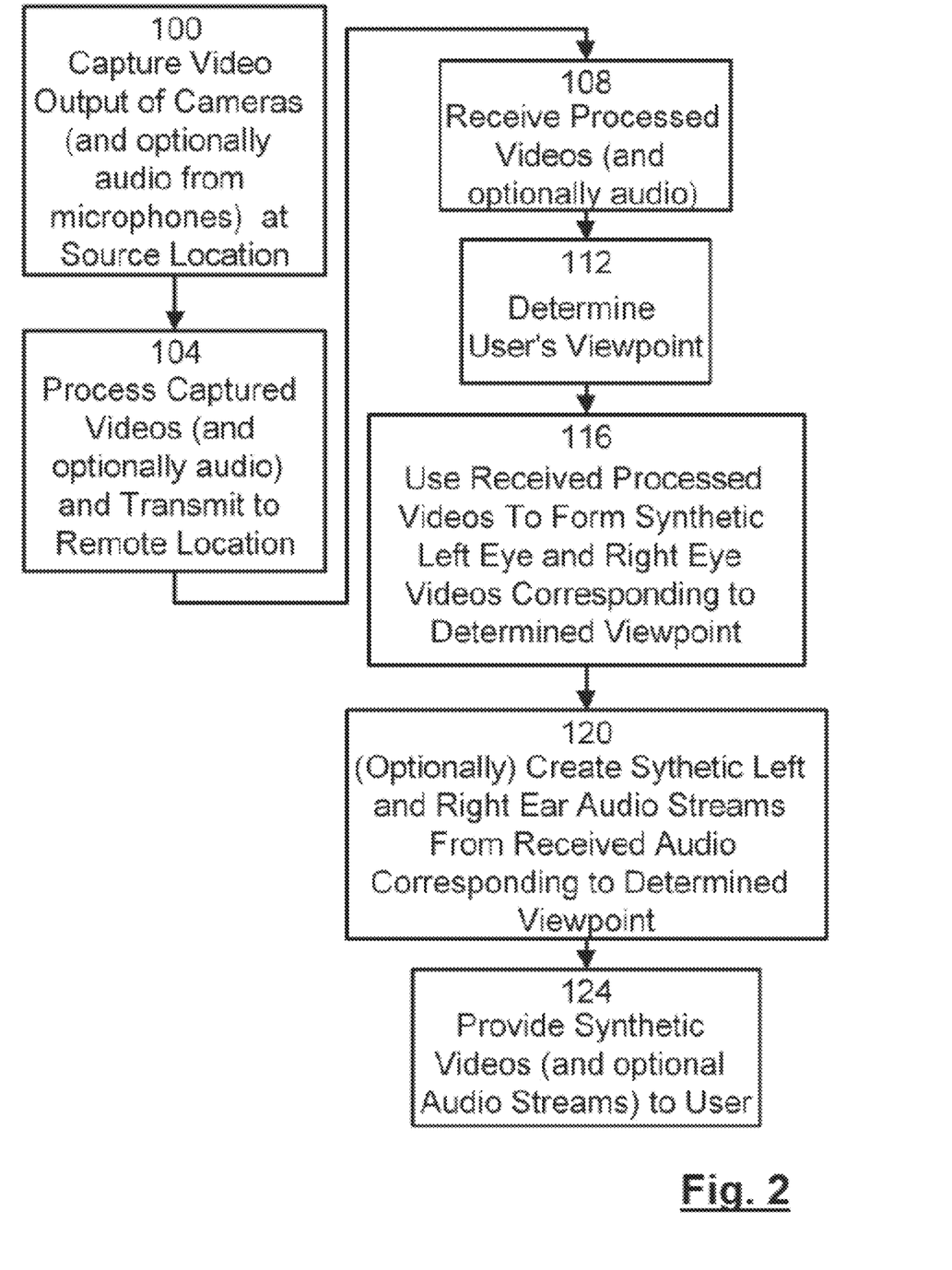
FIG. 2 is a flowchart of a method of implementing the one-way telepresence system of FIG. 1.

This embodiment of the telepresence system is discussed in more detail now, with reference to the flowchart of FIG. 2. The process starts at step 100 wherein the video output of a camera 32, such as each camera 32 of an array 28, is captured by video processing server 56. As mentioned above, at step 104 video processing server processes (e.g.— calibrates if necessary, compresses, etc.) each captured video output and transmits those processed videos, as streaming video, to remote location 44.

As also mentioned above, if it is desired to provide audio from source location 24 to remote location 44, the capture of the audio also occurs at step 100. If audio is provided, it can be compressed (if desired) by video processing server 56 at step 104 and, in any event, is forwarded to telepresence server 52 at remote location 44 at step 104.

At remote location 44, telepresence server 52 performs steps 108 through 124. First, at step 108, telepresence server 52 receives the processed streaming videos transmitted at step 104 from video processing server 56 at source location 24 and the audio streams, if present.

Next, at step 112, telepresence server 52 determines the viewpoint of user 40 from the source location position and the data provided by headset 48, an external tracking system at remote location 44, if any, or other kind of display device.

At step 116, telepresence server 52 operates on the received processed videos to form synthetic video, such as synthetic left eye and right eye videos, corresponding to the determined viewpoint of user 40.

If audio is to be provided, then at step 120, telepresence server 52 creates left ear and right ear synthetic audio streams corresponding to the determined viewpoint and position of user 40.

At step 124 the synthetic video (and audio streams, if available) are provided to the display device for monoscopic or stereoscopic output, based on the specific implementation, at remote location 44. A VR headset may be used for stereoscopic display. A smartphone, tablet computer, flat panel display, or similar, may be used for monoscopic display.

The process of FIG. 2 is repeated at an appropriate rate to provide synthetic video (and audio) to user 40 inducing user 40 to experience the perception that they are physically collocated with subject 36.

It is important to note that the steps performed at video processing server 56 and telepresence server 52 can be performed at different rates. Specifically, video processing server 56 will preferably operate to process and transmit streaming video of subject 36 at a preselected frame rate (e.g.—90 frames per second (FPS)), while telepresence server 52 can operate to construct the synthetic videos for headset 48 at a lower frame rate (e.g. 70 FPS) if telepresence server 52 is computation bound or otherwise unable to process the video at the higher frame rate.

Similarly, telepresence server 52 can operate to update the determined viewpoint of user 40 at a rate less than the frame rate of the received processed videos from video processing server 56. For example, telepresence sever 52 can determine the viewpoint of user 40 at a rate that corresponds to a frame rate of 70 FPS, rather than the rate which would correspond to a frame rate of 90 FPS.

As will be apparent, the rate at which the viewpoint of user 40 is determined can be selected to correspond to the expected rate and amount at which a user may physically alter their viewpoint and, by taking advantage of such physical limitations to limit the rate at which the determined viewpoint is updated, the computational load on telepresence server 52 can be better managed.

As should be apparent to those of skill in the art, a variety of simplifications can also be employed at this point to reduce computational requirements. For example, in stereoscopic embodiments, if the determined viewpoint of the user is sufficiently distant from subject 36 such that the user's left eye viewpoint will be similar (or virtually identical) to the viewpoint of the user's right eye, then telepresence server 56 can construct a single synthetic video and display that single synthetic video to headset 48 for display to both eyes of user 40.

Similarly, the viewpoint determined by telepresence server 52 can be forwarded to video processing server 56 which can then select a subset of cameras 32, which most closely correspond to the received determined viewpoint, and only process and transmit the selected subset of cameras 32 to telepresence server 52, to reduce the required amount of bandwidth required to transmit the videos and to reduce computational needs at telepresence server 52.

Other optimizations and alternative configurations for processing the above-mentioned steps will be apparent to those of skill in the art.

System 20 provides remote user 40 with one or more synthetic videos of subject 36 located at source location 24. The one or more synthetic videos are views formed from video captured by an array 28 of one or more cameras 32 at source location 24. The one or more synthetic videos are formed to correspond to the viewpoint remote user 40 would have of the subject if remote user 40 was physically present at source location 24. Or, in embodiments that use AR, the subject 36 may appear to be present at the location 44.

It is contemplated that system 20 can be used for a wide variety of uses. Examples of such uses include, without limitation, subject 36 being an actor and source location 24 being a stage on which a play is performed, subject 36 being an athlete and source location 24 being a location where a sporting activity is performed, subject 36 being a university lecturer and source location 24 being an area within which an education lecture is presented, etc.

As should be apparent, telepresence server 52 may perform the steps of: determining the viewpoint of user 40; selecting cameras 32 whose viewpoints most closely correspond to the determined viewpoint; decompressing the received processed video from the selected cameras; forming those selected received and decompressed outputs to construct the synthetic videos for the left-eye and right-eye displays; and displaying those synthetic videos to user 40 via headset 48 on an ongoing, near real time, basis. It should be understood by those of skill in the art that the distribution of the performance of the functions described above, between telepresence server 52 and video processing server 56, can be varied if desired.

For example, the construction of the one or more synthetic videos can be performed by video processing server 56, if desired, and the resultant synthetic videos transmitted, via data network 60, to VR headset 48 at remote location 44. In such a case, telepresence server 52 will provide the head position and orientation tracking data to video processing server 56 via data network 60. A variety of other alternatives will occur to those of skill in the art and are intended to be within the scope of the present invention.

While the illustrated example discussed above with respect to FIGS. 1 and 2 shows telepresence server 52 and video processing server 56 being separate components at separate locations, it is also contemplated that telepresence server 52 and video processing server 56 can, in fact be a single device most likely located at source location 24. While such an architecture may be difficult and/or expensive to implement, it is expected that the performance of VR headsets and associated computing hardware will experience significant improvements in the very near future and the present invention is well positioned to exploit these improvements. In such a "single device" case, VR headset 48 will provide the head position and orientation information to the single device via data network 60 and the resultant synthetic videos, and audio streams if desired, are transmitted to VR headset 48, via data network 60, from the single device.

However implemented, ideally, the processing of the video and audio occurs with as little total delay as possible (e.g.—on the order of 150 ms, but preferably less). This total delay criterion is an important factor in selecting the actual technique used to form the synthetic videos and/or audio streams, as well as the compression and decompression techniques used to process the video outputs from cameras 32 and other compute intensive functions of the present invention.

If servers with more computational power are available, such as servers equipped with multiple graphics processing units (GPUs) or FPGA-based, dedicated compute engines, then techniques for forming synthetic videos with high computational complexities, but which provide more realistic results, can be employed. Similarly, if desired, telepresence server 52 can include two or more separate devices to provide the desired level of computational processing. In such a case, for example, the construction of the left eye synthetic video can be performed on a first device while the construction of the right eye synthetic video can be performed on a second device.

Similarly, it is desired that the frame rates of the constructed synthetic videos be at least 60 frames per second (FPS) and more preferably that these frame rates be closer to 90 FPS, but in tests an acceptable user experience has been achieved with frame rates of 30 FPS.

Figure 3:
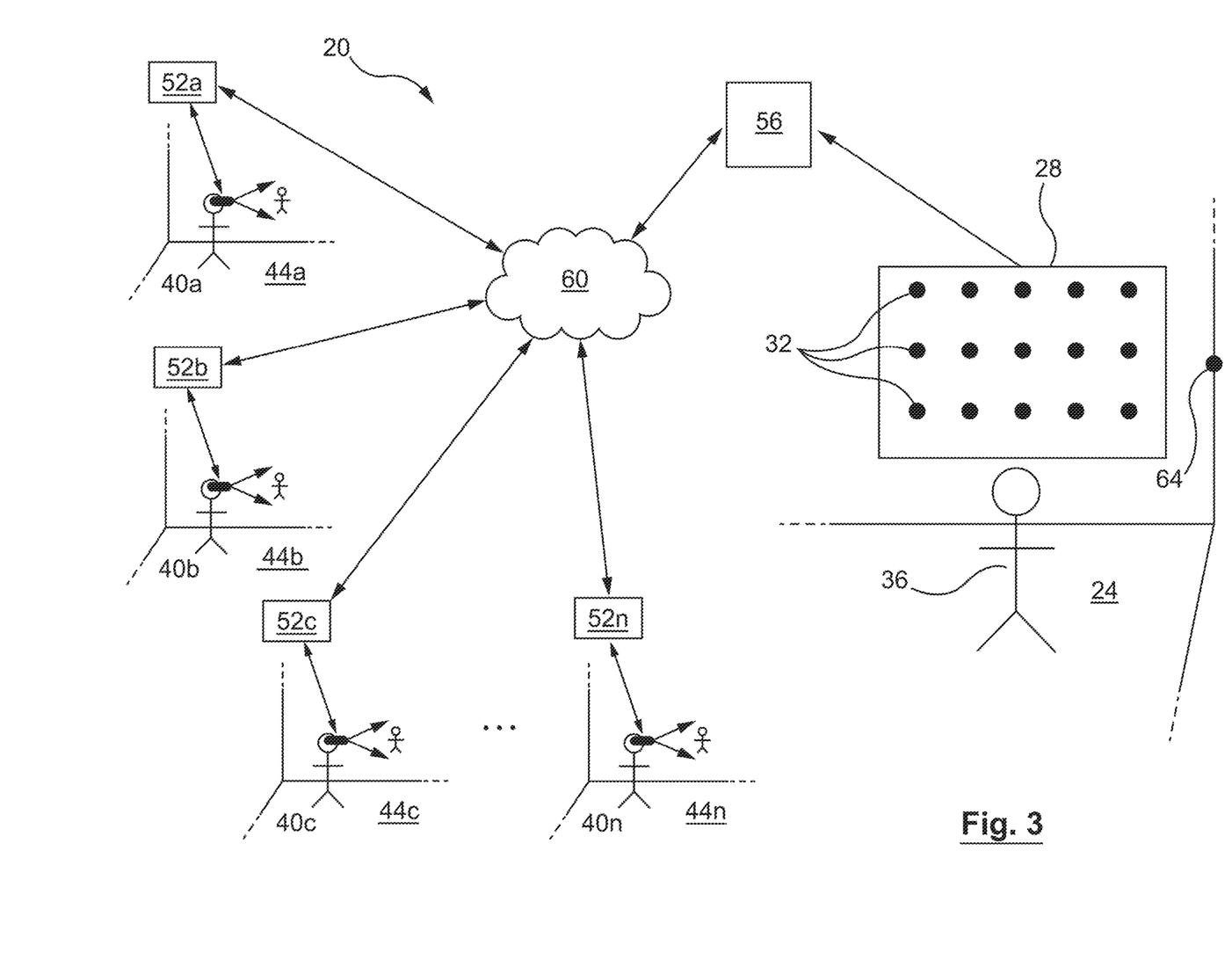
FIG. 3 shows a representation of a multi-user implementation of the one-way telepresence system of FIG. 1.

The arrangement, functionality and specification of the components of system 20 allow multiple remote users to view a single source location 24. Specifically, as shown in FIG. 3, a plurality of remote locations 44a though 44n can each have a respective user (40a through 40n) and a respective telepresence server (52a through 52n).

This version of system 20 is identical to that described above with respect to FIGS. 1 and 2 with the exception that the equipment which is present, and the processing which is performed, at remote location 44 is now replicated at each respective location 44a through 44n.

Thus telepresence server 52a at a remote location 44a receives the processed videos (and audio, if desired) from video processing server 56 at source location 24 and will determine the viewpoint of user 40a and operates to construct the synthetic videos (and audio streams, if desired) which correspond to the determined viewpoint of user 40a.

Similarly, telepresence server 52n at remote location 44n receives the processed videos from video processing server 56 at source location 24 will determine the viewpoint of user 40n (which can differ significantly from the determined viewpoint of users at other remote locations) and constructs the synthetic videos (and audio streams, if desired) which correspond to the determined viewpoint of user 40n.

Thus, by having video processing server 56 process and transmit video streams corresponding to the output of all of the cameras 32 in array 28, and having the viewpoint determination and construction of the synthetic videos performed by a telepresence server 52n at a remote location 44n, system 20 can serve a large number of remote users 40n.

Such a configuration also allows for different remote locations 44n to have different levels of hardware capability and/or operate with different bandwidth requirements. For example, remote location 40a can have a top of the line telepresence server 52 which has sufficient computational power to perform all of its operations at a frame rate of 90 FPS or higher, while remote location 40c may have a lower priced telepresence server 52 with lower computational capabilities, which only support a frame rate of 60 FPS and yet both remote locations can be part of system 20.

Similarly, network 60 may have greater bandwidth available to remote location 44b (i.e.—it is a wired Ethernet connection) than is available to remote locations 44c (i.e.—which is a wireless mobile connection). In such a case, video processing server 56 can provide the processed videos at different levels of compression and/or different frame rates to allow remote locations with different available bandwidths to operate with system 20.

As mentioned above, if it is not required for system 20 to serve multiple remote locations 40n, or if it is desired to reduce the computational load on telepresence server 52 and/or to reduce the cost thereof, system 20 can be reconfigured such that video processing server 56 performs many of the steps and computations performed by telepresence server 52 in the description above or that telepresence server 52 and video processing server 56 be a single device.

In such an embodiment video processing server 56 can receive the output video of all cameras 32 in array 28 as before, but also receives the determined viewpoint of user 40n at remote location 44n. Video processing server 56 then uses the received determined viewpoint to construct the corresponding synthetic videos for user 40n and those synthetic videos are (preferably compressed and) transmitted to telepresence server 52n at remote location 44n. Telepresence server 52n receives the synthetic videos and, if necessary, decompresses them, and provides them to user 40n's headset 48n. In such a system, the operator of source location 24 can operate an appropriate server farm/data center to provide the necessary computational resources.

As will be apparent, in such a configuration a significant reduction of required bandwidth through network 60 is obtained, as only determined viewpoint of the user 40n and the synthetic videos are transmitted. Further, and perhaps more significantly, a significant reduction in the required computational load on telepresence server 52n is obtained. In fact, it is contemplated that the computational load on telepresence server 52n can be well within the computation capabilities of the processing systems embedded in a VR headset 48, thus allowing headset 48 to serve as telepresence server 52 and remote location 40n to be implemented with just an appropriate headset 48.

In embodiments that use a 3D model of a subject, the model may be similar or identical for all viewers and may be generated by a video processing server 56 and transmitted to a telepresence server 52 along with any appropriate textures.

Of course, it is also expected that over time the computational processing power of headsets 48 will inevitably increase and, in due course, even the previously described embodiment with the higher computational load on telepresence server 52 will be able to be performed in the embedded processing systems of headset 48 allowing headset 48 and telepresence server 52 to be a single device.

While FIGS. 1 and 3 shows embodiments of the present invention where a plurality of cameras 32 of array 28 are located in a single plane, the present invention is not so limited. If array 28 is a single plane, then system 20 can only support the construction of synthetic videos corresponding to user viewpoints looking through that plane, or looking through a plane which closely corresponds to the plane of the cameras. While such a configuration has a great many uses, the present invention also contemplates embodiments wherein array 28 may be located in two or more planes, at 90 degrees to each other, corresponding to cardinal views of subject 36. For example, in FIG. 1 array 28 could be located on a wall of source location 24 as shown and also on the adjacent wall immediately to the right of subject 36.

In such a case, users at remote locations would then be able to view subject 36 from viewpoints through either of the two planes. In the extreme case, array 28 could include six planes of cameras 32 to provide viewpoints through planes beside, in front, behind, above and below subject 36.

It is also contemplated that array 28 could also be a non-planar, such as a globe or torus encircling subject 36, etc. and as will be apparent to those of skill in the art, depending upon the formation technique employed, such non-planar arrangements of array 28 can provide acceptable resulting synthetic videos for most, if not all, expected head positions and orientations of user 40 with respect to subject 36.

In the embodiments described above, the synthetic videos displayed to a user 40 by headset 48 will show the appropriate corresponding view of subject 36, but will also show the background, if any, at source location 24. For many applications (educational lecture, etc.) this can be perfectly acceptable or even desirable, but it is contemplated that in other circumstances it will be desired to replace the actual background at remote location 24 fully or partially with another background.

Accordingly, source location 24 can be configured to have an appropriate chromakey compatible background. Chromakey systems are well known and are commonly used to replace an actual physical background with another background with a video. Perhaps the most commonly recognized use of chromakey technology is the display of the weather pattern map behind a TV weatherman. Other techniques, such as depth filtering, may be used in addition to or as an alternative to chromakey.

In this case, the studio wall behind the weatherman is colored a pre-selected "key" color (usually green or blue) and the weatherman stands in front of the wall and has their image captured by the camera. The captured video is then fed to the chromakey system which replaces any portion of the captured video which is the selected "key" color with another video image, in this case the weather pattern map, and thus the viewer sees the weatherman standing in front of the weather pattern map, rather than standing in front of a green wall.

In a similar manner, the backgrounds of remote location 24 can be colored with a preselected key color. In one embodiment, video processing server 56 will include chromakey functionality which will operate on the video output of each camera 32 in array 28 to remove the portions of each captured video which are the key color and to replace the removed portions with selected substitute data, as described below.

In such a case, chromakey operations are performed to remove the key colored portions of each captured video of cameras 32 in array 28, preferably by video processing server 56 but alternatively by a separate chromakey processing system.

The resultant videos can be further processed by video processing server 56, as described above, to produce and transmit processed videos to each telepresence server 52. When a telepresence server 52 receives such chroma-keyed and processed videos, it can render a pre-selected desired virtual reality scene, from the determined viewpoint of user 40, and can composite the synthetic videos with the rendered virtual reality scene replacing the chroma-key removed portions of the captured videos with the composited result being displayed to the respective user. Thus, user 40 sees subject 36 in the selected VR scene.

While this embodiment requires additional computation to be performed at each remote location 44, it offers the advantage that the rendered virtual reality scene which is used to replace the key colored portions of the videos can be different at each remote location 44. This would allow, for example, a first user 40 at a first remote location 44 to watch a singer perform a song in front of a selected background (i.e.—the exterior of the Sydney Harbor Opera House) while a second user 40 at a second remote location 44 could watch the same singer perform the same song in front of a totally different background (i.e.—center stage at Carnegie Hall).

It is also contemplated that in some embodiments, the rendering of the desired virtual reality scene will be performed by video processing server 56 and composited into each processed video sent to telepresence server 52 at each remote location 44, which will then produce the desired synthetic videos as previously described, as the received videos are "complete" with the removed portions containing the VR scene data.

In various other embodiments, a scene is rendered based on video captured at the display device 48. Such capture may be performed by a point-of-view or "look-through" camera of a headset, a camera of a smartphone or tablet computer, or similar. As such, augmented reality may be provided. In various embodiments, an optical see-through AR headset is used, in which case the synthetic video is displayed on a transparent display allowing the user to see the actual environment as background through the display.

Figure 4:
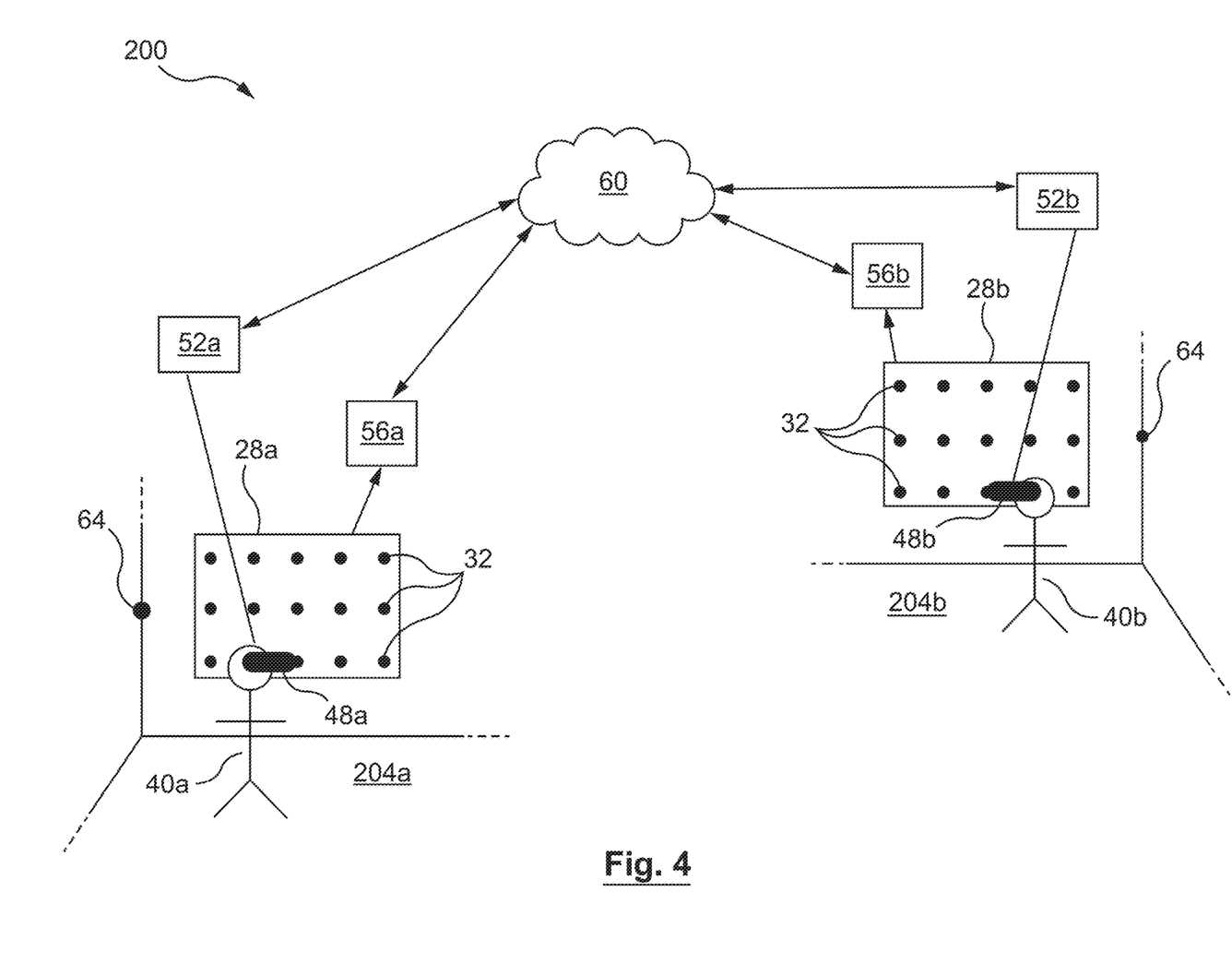
FIG. 4 shows a representation of a two-way telepresence system.

FIG. 4 shows another embodiment of the present invention comprising a two-way telepresence system 200. In system 200, like components to those described above, with respect to system 20, are indicated with like reference numerals.

In system 200, a first user 40a is located at a first location 204a and a second user 40b is located at a second location 204b. Each of users 40a and 40b are equipped with an appropriate VR headset 48. Further, each location 204a and 204b is equipped with a respective array 28a and 28b of one or more video cameras 32. Array 28a and its cameras 32 are arranged to capture video images, from a predefined set of viewpoints, of a target area within location 204a within which, preferably, user 40a is located. Array 28b and its cameras 32 are similarly arranged to capture video images, from a predefined set of viewpoints, of a target area within location 204b within which, preferably, user 40b is located.

It should be noted that arrays 28a and 28b need not have the same configuration, or even the same number of cameras 32. For example, array 28a could be a planar array in front of subject 40b while array 28a can be a torus surrounding subject 40a.

Each location 204a and 204b is equipped with a video processing server 56a and 56b and with a telepresence server 52a and 52b and these devices are interconnected by data communication network 60. As should be apparent to those of skill in the art, telepresence server 52 and video processing server 56 can be implemented in a single device, or in multiple devices.

At location 204a, video processing server 56a receives the video output of each camera 32 in array 28a. Video processing server 56a processes the captured video as described above with respect to system 20, and transmits the processed captured video through data communications network 60 to telepresence server 52b at location 204b.

Similarly, at location 204b, video processing server 56b receives the video output of each camera 32 in array 28b. Video processing server 56b processes the captured video as described above with respect to system 20, and transmits the processed captured video through data communications network 60 to telepresence server 52a at location 204a.

Telepresence server 52a determines the viewpoint of user 40a from data provided by headset 48a worn by user 40a and/or from an external tracking system (not shown). When the viewpoint of user 40a has been determined, telepresence server 52a uses the received processed captured video to construct synthetic videos of user 40b corresponding to the determined viewpoint of user 40a.

These synthetic videos are then displayed, by headset 48a, to user 40a who, as a result, will perceive themselves as being in the presence of user 40b at location 204b.

Similarly, telepresence server 52b determines the viewpoint of user 40b from data provided by headset 48b worn by user 40b and/or from an external tracking system (not shown). When the viewpoint of user 40b has been determined, telepresence server 52b uses the received processed captured video to construct synthetic videos of user 40a corresponding to the determined viewpoint of user 40b.

These synthetic videos are then displayed, by headset 48b, to user 40b who, as a result, will perceive themselves as being in the presence of user 40a at location 204a.

Figure 5:
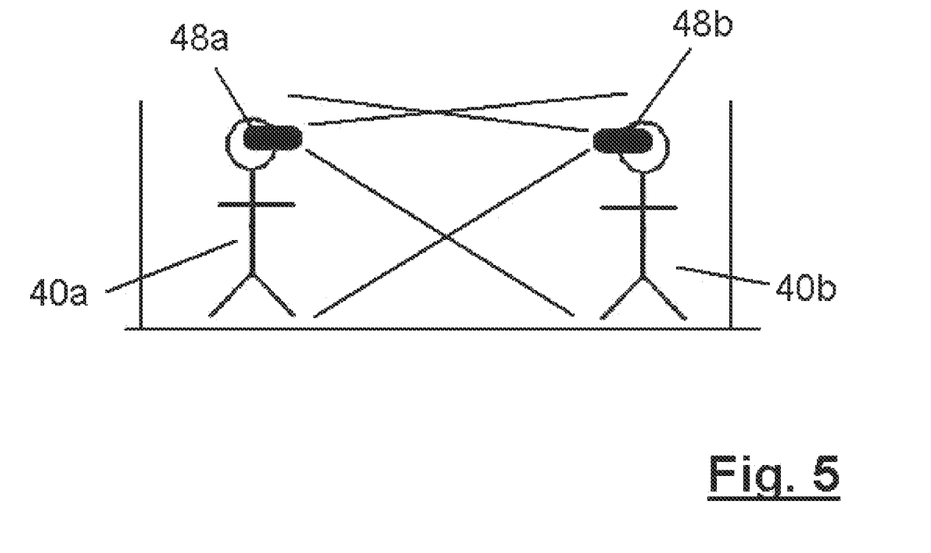
FIG. 5 shows a representation of a result achieved with the system of FIG. 4.

The result of these operations is shown in FIG. 5 wherein user 40a will see user 40b and the background of location 204b in their headset 48a and user 40b will see user 40a and the background of location 204a in their headset 48b.

As should be apparent to those of skill in the art, system 200 is not limited to having two users 40 and, in fact, multiple users can be incorporated into system 200. In such a case, each video processing server 56 will provide its processed videos to the telepresence server 52 at each remote location and each telepresence server will construct synthetic videos which include the portions of the received videos from each video processing server that would be within the determined viewpoint of their respective user 40, thus that user 40 may see portions of multiple other users in their synthetic videos.

It is contemplated that such a two-way telepresence system 200 will allow for business and casual meetings to be more immersive, providing a better telepresence experience, than meetings conducted via video conferencing and/or conference calls as users 40a and 40b will perceive that they are, to at least some extent, actually in the presence of the other user.

Two-way telepresence system 200 can be further improved and/or enhanced by also utilizing some of the additional features previously described above with respect to system 20.

For example, it is contemplated that the addition of virtual reality and chromakey functions can significantly enhance the user's perception of physical presence during use of system 200.

Specifically, if each of locations 204a and 204b are colored with preselected "key" colors, and video processing servers 56a and 56b can perform, or are equipped with, chromakey functionality, then the background captured by array 28a at location 204a and the background captured by array 28b at location 204b can be removed by video processing servers 56a and 56b respectively and a selected replacement background provided.

Figure 6:
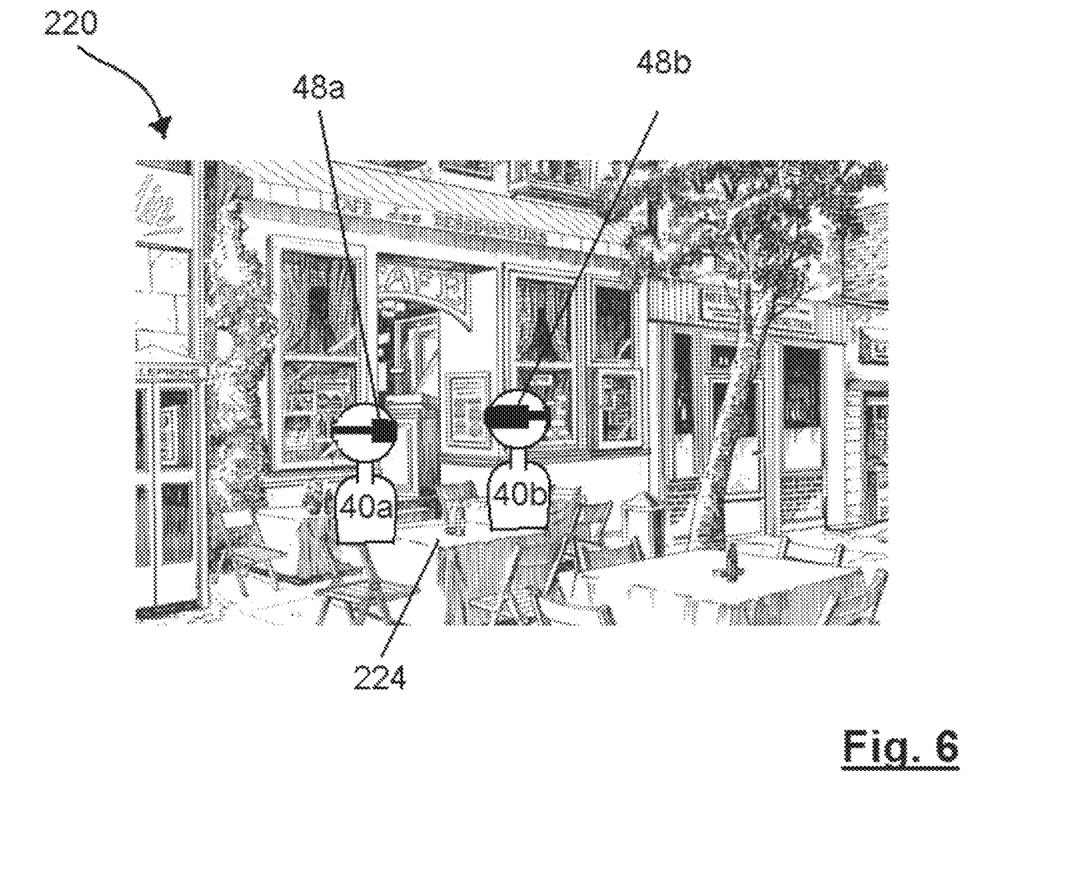
FIG. 6 shows a representation of a result achieved with the system of FIG. 4 which also includes virtual reality rendering and chromakey functionalities.

While the selected replacement background could, for example, be a rendering of a neutrally colored background located at infinity, in a presently preferred embodiment the replacement background will be an appropriate virtual reality rendering of a desired location scene, such as a corporate boardroom, a café on a street in Paris, etc. In this case, as illustrated in FIG. 6, users 40a and 40b will be provided with a virtual environment 220 in which their meeting is conducted.

While currently headset 48a will appear on user 40a and be seen by user 40b and headset 48b will appear on user 40b and be seen by user 40a in the resultant meeting, it is contemplated that further advances in the development of VR headsets will mitigate this factor. It is contemplated that future VR headsets 48 will be much less intrusive and can, for example, more closely resemble a pair of eyeglasses or even contact lenses, etc.

As a further enhancement of the virtual environment shared by users 40a and 40b, props, such as a table (not shown), can be provided at each of locations 204a and 204b and that prop can be colored with the preselected "key" color and the prop is positioned to correspond to the location of a corresponding prop (table, bench, etc.) 224 in virtual environment 220, then users 40a and 40b can "sit" at prop 224 and actually feel it with their hands, further improving their perception of actually being present in virtual environment 220.

An additional feature that can be included in system 200, or even in system 20, when these systems include chromakey functionalities and headsets 48 are augmented as described below, is the ability to also show the user's self in the resulting telepresence environment.

Specifically, as system 200 is described above, in the situation of FIG. 6, if user 40a places their hand on table 224 within their determined viewpoint, their hand will not appear in the synthetic videos being displayed in their headset 48a and user 48a's perception of being physically within virtual environment 220 will be reduced.

Accordingly, in an enhanced embodiment of system 200 (and of system 20) headsets 48 are also provided with two "local video" cameras, each of which is merely a video camera that is positioned and configured to capture a local video signal corresponding to what a user 40 wearing headset 48 would see if the headset was not present. The local video signals captured by these cameras are processed by the chromakey system to obtain a processed local video showing everything which is not the key color that the user would see if they were not wearing headset 48.

At location 204a, these local video signals are obtained by cameras mounted on headset 48a and are chromakey processed, by telepresence server 52a or by an FPGA or computing device included in VR headset 48a, to obtain processed local videos which are then composited with the synthetic videos constructed by telepresence server 52a of user 40b and the rendered scene and the resultant composited videos are displayed to user 40a.

Similarly, at location 204b, these local video signals are obtained by cameras mounted on headset 48b and are chromakey processed by telepresence server 52b and to obtain processed local videos which are then composited with the synthetic videos constructed by telepresence server 52*b* of user 40*a* and the rendered scene and the resultant composited videos are displayed to user 40*b*.

Thus, user 40*a* will see their hands or other parts of their body, which should be included in their viewpoint in virtual environment 220, as will user 40*b*. Also, any items/props in location 204*a* which are not colored in the "key" color and which are within the field of view of the local video captured by the local video cameras will appear to user 40*a* in virtual environment 220. For example, user 40*a* may have a coffee mug (not colored in the key color) which they can hold in their hand and/or place on the table at location 204*a* and that mug will appear in their hand, or on table 224, in virtual environment 220. Further, other users of system 200 will see the mug in their synthetic videos as it will be included in the videos captures by cameras 32 of array 28.

As can now be seen, when system 200 (or system 20) includes headsets 48 equipped with live video capture cameras, locations 204 are colored in the "key" color and system 200 has chromakey and compositing capabilities, users 40 can be provided with a very strong perception that they are physically present at another location, either a remote location, or a virtual environment produced by system 200.

The present invention provides a telepresence system and method that enhances a user's feeling of actual presence in a telepresence created remote location. The system and method provide for one-way (single subject and at least one remote user); two-way (first user and second user, each being a subject to the other); multi-way (a plurality of remote users, each being a subject to all other users); and one-to-many (one subject, many viewers) implementations. The system and method provide a remote user with synthetic monoscopic or stereoscopic views of the subject(s) which are formed from one or more views captured by one or more cameras at the location of the subject. In some embodiments, chromakey (or depth-based) techniques are used to remove unwanted backgrounds. In such cases, a rendered virtual reality scene can be used to replace the unwanted backgrounds. Backgrounds may be omitted or partially provided in augmented reality. Also, each remote user can capture local video, which is processed, via chromakey or depth based techniques, to remove undesired backgrounds and combined with the synthetic videos and, if present, a rendered scene to provide the remote user with a view of the subject including the remaining local video features.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A one-way telepresence method, comprising:
   capturing three-dimensional video from a plurality of stationary cameras at a source location, the video including a subject within a respective point of view;
   at each of a respective at least one remote location, determining a viewpoint of a respective Virtual Reality or Augmented Reality headset worn by a remote user, the viewpoint corresponding to a determination of the head position and head orientation of the remote user based on an orientation tracking system associated with the headset;
   transmitting the viewpoint of the respective remote user from the at least one remote location to the source location;
   at the source location, creating at least one synthetic three-dimensional video from the captured three-dimensional video, the synthetic three-dimensional video including the subject and corresponding to the determined viewpoint of the respective remote user; the creating including:
   a) applying at least one of i) realtime view interpolation techniques to at least a portion of the captured video three-dimensional video and ii) a light field rendering technique to at least a portion of the captured three-dimensional video from the plurality of stationary cameras and;
   b) integrating at least one of i) chromakey and ii) depth filtering technologies;
   transmitting the synthetic three-dimensional video of the subject to the at least one remote location; and
   displaying the synthetic three-dimensional video of the subject to the respective headset at the at least one remote location; wherein the one-way telepresence system including a plurality of remote locations with respective headsets worn by different users; and the synthetic video for each respective headset is different to correspond with the determined viewpoint for each user.

2. The one-way telepresence method according to claim 1, further comprising:
   capturing videos with at least two different points of view at the source location;
   at the source location, creating a pair of synthetic videos from the captured videos, the synthetic videos being formed from at least two of the captured videos;
   transmitting the synthetic videos of the subject to each of the at least one remote location; and
   displaying the synthetic videos of the subject to the respective remote user at each of the at least one remote location.

3. The one-way telepresence method according to claim 1, further comprising removing an undesired background from the captured video such that the undesired background does not appear in the synthetic video.

4. The one-way telepresence method according to claim 1 further comprising:
   at each of the at least one remote location, rendering or capturing a scene corresponding to the determined viewpoint of the respective remote user; and
   compositing the scene with the synthetic video.

5. The one-way telepresence method of claim 1 wherein creating the synthetic video from the captured video comprises creating one or more stereoscopic synthetic videos.

6. The one-way telepresence method of claim 1 wherein creating the synthetic video from the captured video comprises creating a monoscopic synthetic video.

7. The one-way telepresence method of claim 1 wherein the synthetic video is compressed before transmission to each of the at least one remote location.

8. The one-way telepresence system of claim 1 including capturing three-dimensional audio from a plurality of stationary microphones at the source location, and creating synthetic audio corresponding to the synthetic video; wherein the synthetic three-dimensional audio for each respective headset is different to correspond with the determined viewpoint for each user.

9. The one-way telepresence system of claim 1 wherein the creating includes a synthetic video rendered from a 3D model of the subject generated and textured using only captured video.

10. The one-way telepresence system of claim 1 wherein the creating includes a synthetic video using depth information to generate a 3D surface mesh of the subject.

11. The one-way telepresence system of claim 1 wherein displaying occurs within less than 150 ms of the capturing.

* * * * *